United States Patent [19]
Colin

[11] Patent Number: 4,762,563
[45] Date of Patent: Aug. 9, 1988

[54] THIXOTROPIC CEMENT BASE PAINT COMPOSITION AND METHOD

[76] Inventor: Laurence Colin, Box 301, Cross River, N.Y. 10518

[21] Appl. No.: 948,470

[22] Filed: Dec. 29, 1986

Related U.S. Application Data

[63] Continuation of Ser. No. 783,869, Oct. 3, 1985, abandoned.

[51] Int. Cl.⁴ ............................................... C04B 7/02
[52] U.S. Cl. ........................................ 106/97; 106/98; 106/241
[58] Field of Search ................... 106/97, 98, 101, 99, 106/241

[56] References Cited

U.S. PATENT DOCUMENTS

| | | | |
|---|---|---|---|
| 3,063,851 | 11/1962 | Madison | 106/93 |
| 3,228,907 | 1/1966 | Eash | 260/29.7 |
| 3,854,985 | 12/1974 | Suzuki et al. | 106/90 |
| 4,088,804 | 5/1978 | Cornwell et al. | 106/314 |
| 4,127,641 | 11/1978 | Aldcroft et al. | 423/339 |
| 4,390,372 | 5/1983 | Hardin | 106/90 |

FOREIGN PATENT DOCUMENTS

| | | | |
|---|---|---|---|
| 8202709 | 8/1982 | PCT Int'l Appl. | 106/98 |
| 2027007 | 2/1980 | United Kingdom | 106/97 |

OTHER PUBLICATIONS

Nylen et al., Modern Surface Coatings (John Wiley & Sons, N.Y., 1965) pp. 556-561, TP 935 N9.

Primary Examiner—Steven Capella
Attorney, Agent, or Firm—E. Lieberstein

[57] ABSTRACT

A thixotropic cement-based paint composition and method wherein the composition is formed by combining Portland cement with presized filter particles having a predetermined relationship by weight to the cement. Water is combined in a volumetric proportion to form an average viscosity of about 3,000 to 8,000 centipoise.

21 Claims, 3 Drawing Sheets

THIXOTROPIC CEMENT BASE PAINT COMPOSITION AND METHOD

This application is a continuation of prior U.S. application Ser. No. 783,869, filed 10/3/85 now abandoned.

FIELD OF INVENTION

The present invention relates to a thixotropic cement base paint composition and to a method of forming a thixotropic cement base paint.

BACKGROUND OF INVENTION

Surfaces formed of concrete block, brick or poured concrete contain surface imperfections including voids, hairline cracks, poor joints and uneven areas. For aesthetic reasons it would be desirable to apply a coating of paint over these surfaces to fill the voids and leave a protective overcoat. Conventional cement base paints are acceptable for weatherproofing in that they will seal a porous masonry structure but cannot provide a smooth or uniformly thick outer coating. Instead they tend to be absorbed into the structure. On the other hand a conventional latex formulated paint forms a coating which will fill hairline cracks but is much too thin to fill voids and does not adhere well to a cementatious surface. In fact, the thin film formed by conventional latex formulated paint cannot provide a coating of satisfactory smoothness and thickness to plug up the cracks in a cementatious surface even when both a primer and finishing coat is applied. If too heavy a layer of latex paint is applied to the surface, cracking or crazing will occur as the paint cures and the paint will tend to flake and peel after curing. A paint composition which will coat a cementatious surface in a reasonable thickness to cover surface irregularities, voids and defects and which can be uniformly applied to leave a smooth protective outer layer would represent an entirely new architectural tool for the building trades and the homeowner.

In the parlance of the paint industry a paint is a three component system of binder, pigment and diluent. The paint should spread readily and easily as it is applied to a surface yet should have a substantial reluctance to flow under gravity. However, even the most extremely viscous commercially available latex formulated paint is poor in its resistance to flow under gravity. A paint which is thixotropic will come close to providing an ideal physical flow characteristic, i.e., one that is as free flowing as desired during application but is essentially immobile immediately after application. Commercially available latex paint formulations vary widely in viscosity but are essentially Newtonian or non-thixotropic. Thixotropy is the property of a liquid or gel that is characterized by loss of viscosity under stress and by regain of the original viscous state upon removal of the stress. Many conventional aqueous based paints include viscosity additives in their formulation t increase their resistance to flow. However, the degree of thixotropy in such paints is minimal if at all.

It is known to us cement base paints which use portland cement as the binder and principal constituent for application upon masonry surfaces. The portland cement, usually white portland, is combined with lime and usually an accelerator such as calcium chloride to which may be added pigment or coloring agents. The ingredients are mixed and milled to form a dry powder. The dry powder is commercially sold with instructions to mix with water to form a slurry which is applied to the masonry surface as a conventional paint. A conventional cement based paint is, however, nonthixotropic and the use of lime poses environmental dangers and causes efflorescence. Portland cement has also been mixed with nonaqueous organic paint compositions in a attempt to formulate a paint composition for masonry surfaces. Such organic compositions are also nonthixotropic and tend to form coatings which lack cohesiveness and are disposed to cracking and crazing as the paint cures.

SUMMARY OF THE INVENTION

A thixotropic cement base paint composition has been discovered in accordance with the present invention which may be used alone or in combination with any conventional water based paint preferably a latex paint for application to a cementatious surface. Examples of the uses for the cement base composition of the present invention include:

1. Forming a coating for use on interior or exterior cementatious surfaces to provide a smooth, non-efflorescing sealed layer;

2. forming a coating for use as a weather tight layer on porous subsurface concrete block or brick walls;

3. using the composition as a filler material to fill in defects in the surface of concrete block or poured cement walls;

4. forming a paint composition in combination with a conventional water based latex paint to both seal, protect and color the surface upon which it is applied, interior or exterior, in one application; and 5. forming a coating to add texture or design in depth where either irregularities or flaws exist or where the monotony of unitized block or brick walls must be overcome, for aesthetic and/or architectural reasons.

The cement base paint composition of the present invention broadly comprises portland cement in combination with presized particles of inorganic mineral filler and a desired pigment with the filler having a maximum particle size of about 50 microns in a relationship by weight to the portland cement of between $P/2 \leq F$; where P represents portland cement and F represents the mineral filler with the combination adapted to be mixed with water to a desired consistency.

The method of the present invention for forming a cement base latex paint broadly comprises intermixing portland cement with presized inorganic filler particles having a maximum particle size of about 50 microns in a weight relationship wherein the filler particles by weight equals at least one-half the weight of portland cement, adding water to form a slurry; mixing the slurry with a conventional latex formulated paint in situ just prior to application in a volume relationship of at least about 1 part slurry to 1 part latex paint to form a thixotropic cement based paint composition and applying the paint composition to a cementatious surface.

OBJECTS OF THE INVENTION

It is the principal object of the present invention to provide a thixotropic cement base paint composition for any cementatious surface.

It is a further object of the present invention to provide a method for forming a thixotropic cement base paint composition.

It is an even further object of the present invention to provide a thixotropic cement base paint formulation which can be added to any water based paint preferably a latex formulated paint to form a thixotropic cement base latex paint composition for covering surface imperfections and voids on cementatious surfaces as well as to enhance the aesthetics of the surface.

BRIEF DISCRIPTION OF THE DRAWINGS

These and other objects and advantages of the present invention will become apparent from the following detailed description of the invention when read in conjunction with the accompanying drawings of which:

FIG. 1 is a curve of a typical viscosity characteristic of a portland cement and water mixture with respect to time;

FIG. 2 is a family of viscosity curves for a cement base paint composition containing portland cement, presized inorganic filler particles and water at different relative concentrations of inorganic filler particles to portland cement; and FIG. 3 is a family of viscosity curves for a cement base paint composition containing portland cement, inorganic filler particles and water at different maximum inorganic filler particle size levels.

DETAILED DESCRIPTION OF THE INVENTION

Figure 1:
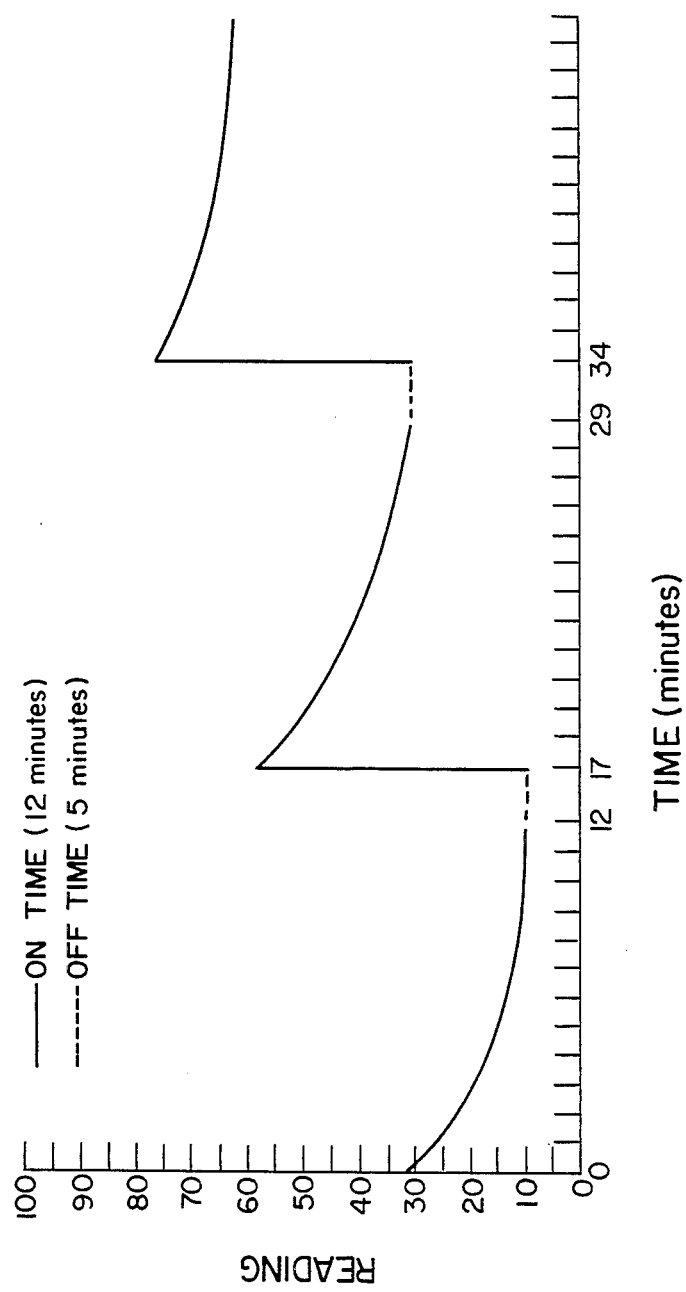

Referring now more particularly to FIG. 1 which illustrates the typical viscosity characteristic of a portland cement and water mixture. The viscosity measurements were taken using a conventional Brookfield viscometer of the RV type with a number four spindle at a number 20 speed and at a factor of 100. A type II portland cement was used in a 3 to 1 portland to water by volume mix. The reading values are merely a relative indication used to plot the characteristic curve. The curve would be substantially identical in characteristic for any portland cement to water ratio which would permit the cement to gel. As indicated on the time reference, the machine was consecutively recycled for a twelve minute "on" period and then for a five minute "off" period. Each time the machine was turned on the measurement would rise to a higher level than the preceding cycle and descend to a relatively constant level substantially higher than the constant level reached in the preceding cycle. This characteristic is typical of a conventional cement and water mixture which can be classified as being nonthixotropic. To be truly thixotropic the readings should be substantially repeatable, cycle to cycle, i.e., repetitive cycles should exhibit hysteresis. A hysteresis plot would appear as a loop with the area of the loop representing the degree of thixotropy. Conventional cement base paints and commercially available latex formulated paints are either nonthixotropic or essentially Newtonian, i.e., exhibiting a substantially flat viscosity characteristic curve.

It was discovered in accordance with the present invention that a composition of portland cement and water can be made to respond in a truly thixotropic manner by the addition of presized inorganic filler particles below a predetermined minimum proportion by weight to the portland cement. The ratio of presized filler particles to portland cement must satisfy the following relationship: $P/2 \leq F$ where F is the minimum requirement by weight of the presized inorganic filler particles and P is the weight of the portland cement.

As indicated by the above formula the minimum quantity of presized inorganic filler particles must represent at least 50% of the weight of the portland cement to provide thixotropy to the composition. Additional filler particles may be added as desired and such need not be presized. However, to formulate an acceptable cement base paint composition a sufficient quantity of portland cement must be included so that the composition is not portland deficient, i.e., there should be enough portland to permit the composition to cure.

Figure 2:
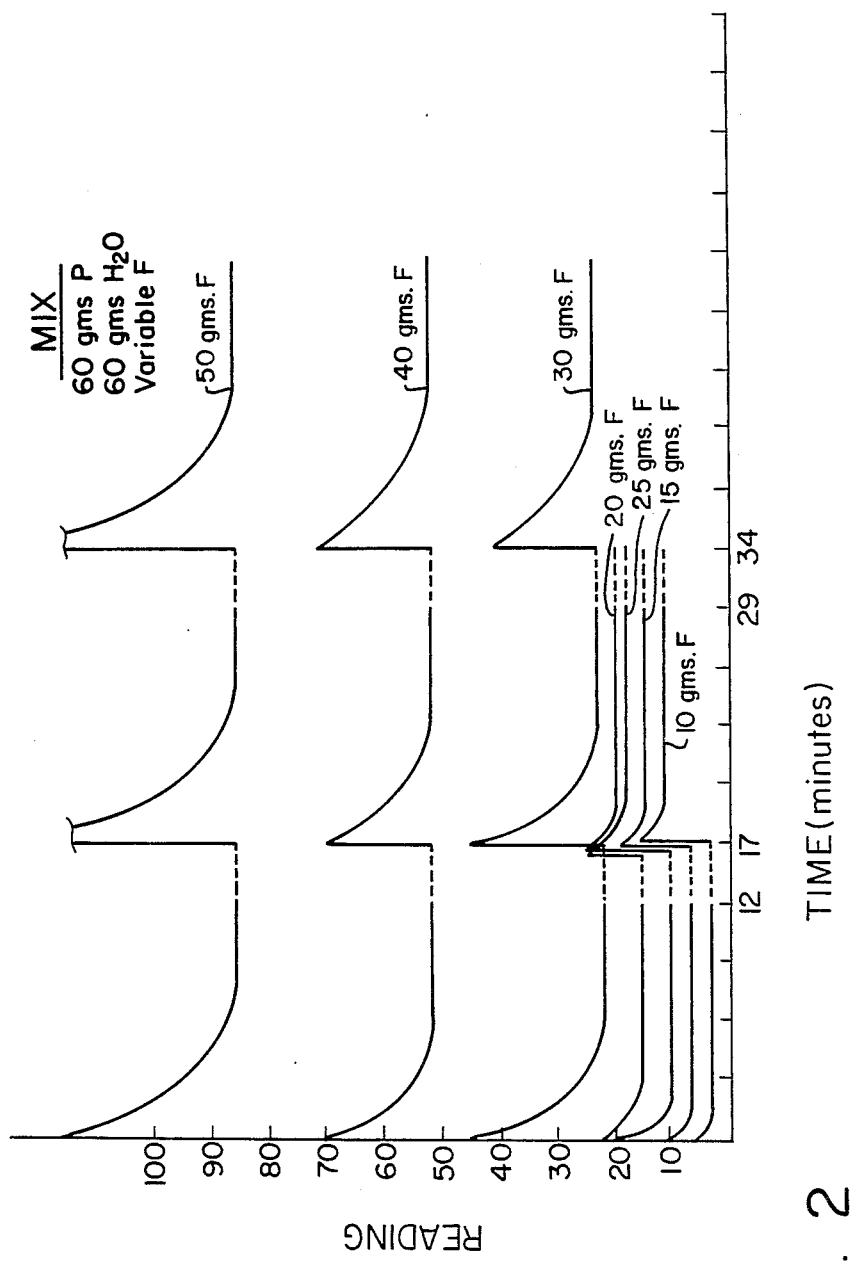

The importanc of the minimum relationship of $P/2 \leq F$ for formulating a thixotropic cement base paint is demonstrated in FIG. 2. A similar composition of 60 grams portland cement, 60 grams water and presized inorganic filler particles of below the maximum size of 60 microns is standard for each curve with the concentration of the presized filler particles varied. Upon reaching a concentration satisfying the above relationship, the composition becomes thixotropic.

Figure 3:
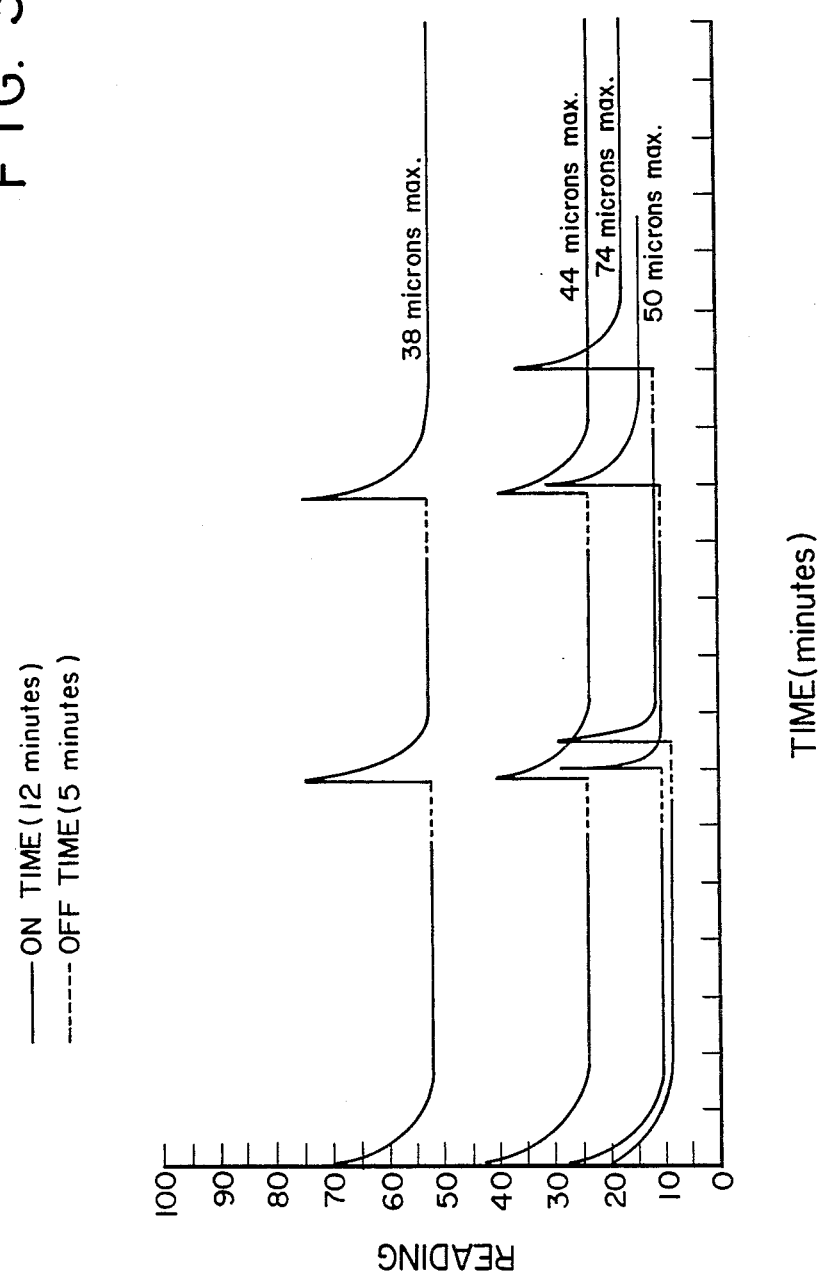

It should, however, be understood, as indicated hereinbelow, that the size of the inorganic filler particles F must be below a critical predetermined maximum size of about 50 microns and preferably below 44 microns. This is demonstrated in FIG. 3 showing a family of viscosity curves for a composition of 60 grams portland cement, 30 grams of inorganic filler particles and 60 grams water with the maximum size of the filler particles varied. Thixotropy is substantially obtained at a 50 micron maximum particle size level with a 44 micron maximum particle size level or below being truly thixotropic.

The particle sizes were determined by passing the filler particles through standard sieve size screens and eliminating the trapped particles. Accordingly, a standard No. 300 sieve will pass a maximum particle size of 50 microns and a No. 325 sieve will pass a maximum particle size of 44 microns. As shown in FIG. 3 a 74 micron size particle (No. 200 sieve) or larger is nonthixotropic.

Any conventional inorganic filler material preferably a mineral filler and most preferably silica (silicon dioxide) may be used for the presized inorganic filler particles. Silica particles with a crystalline structure is preferred over the non-crystalline amorphous structure only from a cost standpoint. Natural sand which has been presized in accordance with the present invention is the preferred choice. Other conventional inorganic filler particles include calcium carbonate, calcium sulfate, calcium metasilicate, magnesium silicate, alumina, zinc oxide, barium sulfate, mica and synthetic inorganic particles such as "zeeospheres" a trademark product of Zealand Industries of St. Paul, Minnesota USA.

The amount of water added to form a cement base paint slurry of acceptable consistency is of course important for the intended application. To be acceptable as a paint composition, the slurry should have an average viscosity of between 3,000 to 8000 cps (centipoises). The preferred volumetric relationship between the dry mixed material of portland cement and presized inorganic filler particles and the water content should be about 1 part water to 1.5 parts of the total dry mixture. The same volumetric relationship should exist even if a coloring agent or pigment is added to the dry mixture.

Any coloring agent may be added to the dry mixture of portland cement and inorganic filler particles. The portland cement is preferably a white portland cement. Coloring agents or pigments contemplated for use in formulating a cement base paint in accordance with the present invention include colored as well as white pigments. Suitable pigments include any water soluble paint pigment such as titanium dioxide, zinc oxide, barium sulfate (barytes), clay mica, calcium carbonate (whiting), silica, ultramarine blues, chromium oxides, carbon black, iron oxides, magnesium silicate (talc), aluminum silicate, diatamaceous silica, chrome green, iron blues, iron salts of nitroso compounds, and any of the food and/or drug and cosmetic lake colors and the like in various combinations and preparations depending on the end use for which the paint is designed.

The present invention contemplates the use of the cement base paint as hereinbefore defined as a stand alone product or in combination with any conventional water base paint preferably of latex formulation. In the latter respect the conventional paint operates as the pigment for the slurry formed between the portland cement, presized inorganic filler particles and water. A reduced concentration of water can be used based upon the viscosity of the latex paint formulation and the texture desired for the combined paint product. The preferred range is between a 1:1 volumetric ratio and a 1:2 ratio of latex paint to a cement base paint slurry of portland cement, presized inorganic filler particles and water.

The cement base paint slurry gives the conventional latex paint formulation the property of thixotropy.

Suitable commercially available polymeric latex paint formulations generally contain by way of non-limiting example from about 40 to 60 weight percent of latex polymers formed from natural rubber, styrenebutadiene copolymer, butadiene-acrylonitrile copolymers, polyvinyl chloride, polyvinyl acetate, copolymers of vinylidene chloride and acrylonitrile, polytetrafluoroethylene, ethylacrylate-methacrylate copolymers, butadiene-styrene-acrylonitrile copolymers, isobutyleneisoprene copolymers, acrylonitrilebutylacrylate-methacrylic acid copolymers, styrene-butyl acrylateacrylic acid copolymers, copolymers of styrene, acrylonitrile, octyl acrylate and methacrylic acid, copolymers of methyl methacrylate, ethyl acrylate and ammonium methacrylate.

The conventional latex paint includes a pigment. Accordingly, it is unnecessary to add further pigment. The following is a list of typical commercially available latex brand paints which have been tested in combination with the cement base slurry of the present invention to demonstrate that thixotropy can be established in a latex formulated paint independent of formulation:
1. "Pierce Versiotile" a trademark of Pierce Co.
2. Acrylic latex gloss manufactured by Red Devil Paint Co.
3. Latex Flat Wall Finish manufactured by Pratt and Lambert Paint Co.
4. Interior/Exterior Enamel manufactured by Arnesto Paint Co.
5. Wall Satin Latex Interior Flat manufactured by Regal Paint Co.
6. Flat latex manufactured by Pittsburgh Paint Co.
7. Latex Enamel manufactured by Magic Lux Paint Co.
8. Interior Enamel manufactured by Pittsburgh Paint Co.
9. Exterior Acrylic Latex Satin Finish manufactured by Sears Roebuck & Co.
10. Interior/Exterior Glass Enamel manufactured by Glidden Industries
11. Flat latex manufactured by Oxline Paint Co.
12. Low Lustre manufactured by Mooreguard Although cement and presized inorganic filler particles may be added directly to a latex formulated paint it is preferred in accordance with the present invention that a cement base paint slurry of portland cement, presized inorganic filler particles and water first be formed as explained heretofore.

The property of thixotropy apparently also results in substantially increased coverage during application using the cement base paint composition of the present invention when formulated with or without the addition of a latex paint. The yield is approximately two and one-half times the coverage on a comparison basis between the cement base paint composition and a conventional cement base paint and between the cement base latex paint composition of the present invention compared to an equivalent volume of conventional latex paint.

What is claimed is:

1. A composition for forming a cement base paint having thixotropic flow properties when mixed with water comprising an hydraulic cement in combination with presized particles of inorganic filler with the filler particles having a maximum particle size of about 50 microns and having a minimum relationship by weight to the cement of $P/2 \leq F$; where P represents the cement and F represents the filler particles wherein said hydraulic cement and said presized filler particles are capable of causing thixotropy in the composition when combined in the aforementioned relationship in a mixture with water without the addition of any other ingredient or additive.

2. A cement base paint composition as defined in claim 1 wherein the presized particles of inorganic filler particles have a maximum particles size of 44 microns.

3. A cement base paint as defined in claim 1 wherein said water is added in a volumetric proportion of about 1 part water to about 1.5 parts dry mixture of portland cement and presized inorganic filler particles.

4. A cement base paint as defined in claim 3 wherein said presized particles of inorganic filler is selected from the group consisting of silica, calcium carbonate, calcium sulfate, calcium metasilicate, magnesium silicate, alumina, zinc oxide, barium sulfate, mica and other silicates.

5. A cement base paint as defined in claim 4 wherein said presized particles of inorganic filler is composed of silica.

6. A cement base paint as defined in claim 4 wherein said portland cement is white portland cement.

7. A cement base paint as defined in claim 6 further comprising one or more coloring agents.

8. A cement base paint as defined in claim 7 wherein said coloring agents comprise any water soluble paint pigment.

9. A cement base paint as defined in claim 8 wherein said coloring agents are selected from the group consisting of titanium dioxide, zinc oxide, barium sulfate, clay mica, calcium carbonate, silica, ultramarine blues, chromium oxides, carbon black, iron oxides, magnesium silicate, aluminum silicate, diatamaceous silica, chrome green, iron blues, iron salts of nitroso compounds and any of the food and/or drug and cosmetic lake colors.

10. A cement base paint as defined in claims 1 or 6 further comprising the addition of a commercial latex formualted paint in a volume relationship of at least about 1 part composition of portland cement, presized filler particles and water in the form of a slurry to 1 part latex paint to form a thixotropic mixture.

11. A cement base paint as defined in claim 10 wherein said conventional latex formulated paint is combined with a slurry of said portland cement, presized filler particles and water in a volumetric ratio of latex paint to slurry of between 1:1 and 1:2.

12. A method of forming a cement base paint having substantial thixotropic properties, comprising; intermixing portland cement with presized inorganic filler particles having a maximum particle size of about 50 microns in a weight relationship to the portland cement wherein the filler particles by weight equals at least one-half the weight of the portland cement; and adding water to form a slurry with a consistency based on an average viscosity of between about 300 to about 8000 cps (centipoises).

13. A method as defined in claim 12 wherein said water is added in a volumetric proportion of about 1 part water to about 1.5 parts dry mixture of portland cement and presized inorganic filler particles.

14. A method as defined in claim 13 wherein said presized particles of inorganic filler is below a maximum of 44 microns.

15. A method as defined in claim 13 wherein said presized particles of inorganic filler is selected from the class consisting of: silica, calcium carbonate, calcium sulfate, calcium metasilicate, magnesium silicate, alumina, zinc oxide, barium sulfate, mica and other silicates.

16. A method as defined in claim 15 wherein said portland cement is white portland cement.

17. A method as defined in claim 16 further comprising the step of adding one or more water soluble coloring agents.

18. A method as defined in claim 17 wherein said water soluble coloring agents are selected from the class consisting of: titanium dioxide, zinc oxide, barium sulfate, clay mica, calcium carbonate, silica, ultramarine blues, chromium oxides, carbon black, iron oxides, magnesium silicate, aluminum silicate, diatamaceous silica, chrome green, iron blues, iron salts of nitroso compounds and any of the food and/or drug and cosmetic lake colors.

19. A method as defined in claim 12 or 16 further comprising the step of adding a conventional latex formulated paint in a volume relationship to the slurry of at least about 1 part slurry to 1 part latex paint.

20. A method as defined in claim 19 wherein said volumetric relationship of latex paint to slurry is between 1:1 and 1:2.

21. A composition as defined in claim 2 wherein said cement is Portland cement and wherein water is added in a volumetric proportion to form an average viscosity of between about 3000 to 8000 centiposes.

* * * * *